US010837888B2

(12) United States Patent
Fischer

(10) Patent No.: US 10,837,888 B2
(45) Date of Patent: Nov. 17, 2020

(54) MEASURING SYSTEM, MEASURING ARRANGEMENT, AND METHOD FOR DETERMINING MEASURING SIGNALS DURING A PENETRATION MOVEMENT OF A PENETRATION BODY INTO A SURFACE OF A TEST BODY

(71) Applicant: Helmut Fischer GmbH Institut für Elektronik und Messtechnik, Sindelfingen (DE)

(72) Inventor: Helmut Fischer, Oberägeri (CH)

(73) Assignee: Helmut Fischer GmbH Institut für Elektronik und Messtechnik, Sindelfingen (DE)

( * ) Notice: Subject to any disclaimer, the term of this patent is extended or adjusted under 35 U.S.C. 154(b) by 230 days.

(21) Appl. No.: 16/070,597

(22) PCT Filed: Jan. 9, 2017

(86) PCT No.: PCT/EP2017/050305
§ 371 (c)(1),
(2) Date: Jul. 17, 2018

(87) PCT Pub. No.: WO2017/125269
PCT Pub. Date: Jul. 27, 2017

(65) Prior Publication Data
US 2019/0025172 A1 Jan. 24, 2019

(30) Foreign Application Priority Data
Jan. 18, 2016 (DE) .......................... 10 2016 100 707

(51) Int. Cl.
*G01N 3/46* (2006.01)
*G01N 3/42* (2006.01)

(52) U.S. Cl.
CPC ................. *G01N 3/46* (2013.01); *G01N 3/42* (2013.01); *G01N 2203/0044* (2013.01); *G01N 2203/0078* (2013.01); *G01N 2203/0617* (2013.01)

(58) Field of Classification Search
CPC .. G01N 3/40; G01N 3/42; G01N 3/46; G01N 2203/0044; G01N 2203/0078; G01N 2203/0082; G01B 5/28; G01B 21/30
(Continued)

(56) References Cited

U.S. PATENT DOCUMENTS 2,628,495 A 2/1953 Day
5,067,346 A 11/1991 Field
(Continued)

FOREIGN PATENT DOCUMENTS

| DE | 69917780 | 6/2005 |
|----|----------|--------|
| JP | S63171339 | 7/1988 |
| JP | H05346383 | 12/1993 |

OTHER PUBLICATIONS

International Search Report for corresponding Patent Application No. PCT/EP2017/050305 dated Apr. 7, 2017.

*Primary Examiner* — Benjamin R Schmitt
(74) *Attorney, Agent, or Firm* — Renner, Otto, Boisselle & Sklar, LLP

(57) ABSTRACT

A measuring system for detecting measuring signals during a penetration movement of a penetration body into a surface of a test body, including a housing with a power generating device, which is operatively connected to a penetration body for generating a displacement movement of the penetration body along a longitudinal axis of the housing, and which actuates a penetration movement of the penetration body into the surface of the test body to be examined, or which positions the penetration body on the surface of the test body for scanning, and having at least one first measuring device
(Continued)

Figure 1:
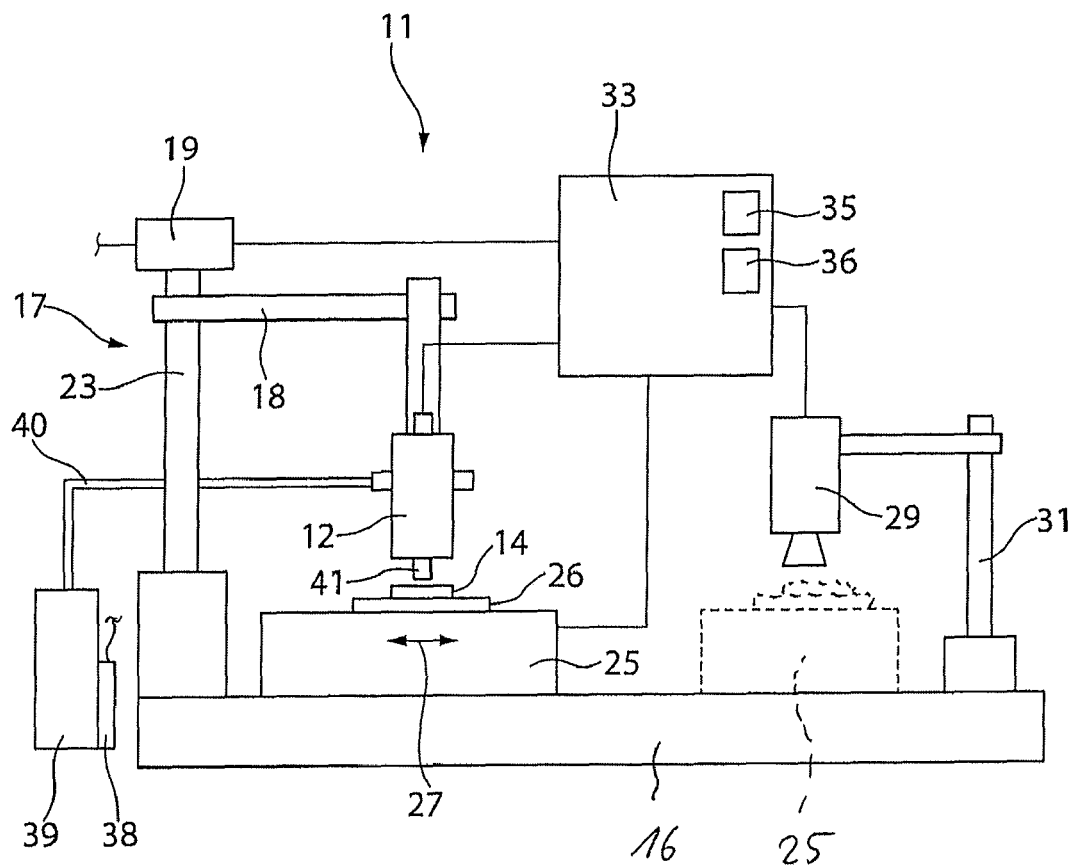

for measuring the penetration depth into the surface of the test body or a displacement movement of the penetration body along the longitudinal axis of the housing during a scanning movement on the surface of the test body. The power generating device is actuated by a pressure medium for the penetration movement of the penetration body.

26 Claims, 4 Drawing Sheets

(58) Field of Classification Search
USPC .................................. 73/81, 85, 104, 105
See application file for complete search history.

(56) References Cited

U.S. PATENT DOCUMENTS

| | | |
|---|---|---|
| 2004/0011119 A1 | 1/2004 | Jardret |
| 2006/0150710 A1 | 7/2006 | Moyse |
| 2014/0150562 A1 | 6/2014 | Warren |
| 2014/0373608 A1 | 12/2014 | Bellemare |

MEASURING SYSTEM, MEASURING ARRANGEMENT, AND METHOD FOR DETERMINING MEASURING SIGNALS DURING A PENETRATION MOVEMENT OF A PENETRATION BODY INTO A SURFACE OF A TEST BODY

The invention relates to a measuring device as well as a measuring arrangement and a method for detecting measuring signals during a penetration movement of a penetration body in a surface of a test body, and also for identifying the scratch resistance of the surface of the test body.

A measuring device and a method for measuring the scratch resistance of a surface of a test body are known from DE 699 17 780 T2 which has a measuring table for accommodating a test body as well as a handling apparatus for transferring the measuring device from an initial position into a measuring position. Furthermore, a controller is provided by means of which both a travelling movement of the measuring table along an axis and a penetration movement of the penetration body is controlled [lacuna] by the measuring device after the placing of a test body on the surface to be tested, such that the penetration body penetrates the surface of the test body during the travelling movement of the measurement table.

The measuring device has a piezoelectric actuator for controlling the penetration movement of the penetration body after the placement on the surface of the test body, said actuator supplying a first holding plate which is moveable up and down by means of two leaf spring pairs. This holding plate accommodates a further plate which is in turn mounted in a manner which is moveable up and down, wherein the penetration body is arranged in this plate. A measuring device is provided between the holding plate and the plate accommodating the penetration body, said measuring device measuring the penetration path. Furthermore, a measuring device for identifying the normal force is arranged adjacently.

This measuring device has the disadvantage that a constructively complex and heavy structure is provided by the holding plate and by the plate accommodating the penetration body, as well as by the leaf spring pairs which are respectively selected for mounting. Thus, not only are large overall dimensions necessary, but also the piezoelectric drive must be designed to be correspondingly large in order to apply the force for controlling a penetration movement. Furthermore, this measuring device is slow due to the complex and constructive structure. Furthermore, the measuring device is costly due to the control of the penetration body by means of a highly precise piezoelectric actuator.

A hardness measuring instrument is known from JP 63-171 339 A which has a penetration body for introducing a scratch into a measuring surface in a moveable carriage. The penetration movement of the penetration body is controlled by an oil pressure chamber by the control pressure being raised by a hydraulic pump. This device has the disadvantage that the system is slow. A scanning movement for detecting the surface roughness is not possible.

The object of the invention is to create a measuring device for detecting measuring signals during a penetration movement of a penetration body into a surface of a test body, in particular for identifying the scratch resistance of the surface of the test body or for detecting measuring signals during a scanning movement of a penetration body on the surface of the test body, in particular for identifying the surface roughness of the test body, and a measuring arrangement as well as a method for identifying measuring signals during a penetration movement of a penetration body, in particular for identifying the scratch resistance of the surface of the test body or during a scanning movement of the penetration body, whereby an increased accuracy and a cost reduction are enabled.

This object is solved by a measuring device having a penetration body and having a force generating apparatus, to which the penetration body is operatively connected and penetrates a surface to be measured of the test body or scans a surface to be measured of the test body and having at least one measuring device for measuring the depth of penetration or the surface roughness, in which the force generating apparatus is controlled by means of a gaseous pressure medium for the penetration movement or for the scanning movement of the penetration body. The use of such a force generating apparatus, which controls the penetration movement or the scanning movement of the penetration body by means of a pressure medium, has the advantage that the pressure supplied by means of the penetration movement can be directly converted into a penetration movement, i.e. an increase in the pressure force corresponds to a direct increase in the force for the penetration movement, and vice versa. During a scanning movement, the supplied pressure preferably acts in the force generating apparatus as a rigid actuating member, whereby the changes in the surface of the test body can be transferred to the force generating apparatus and preferably to a sensor element. A simple and direct control can thus be enabled. Additionally, such a force generating apparatus operating with a pressure medium has a low mass and thus a low mass slowia. Such a force generating apparatus, which operates by means of a pressure medium, is thus furthermore enabled to be independent of temperature changes, because a change in temperature affects the pressure directly and this pressure can be immediately readjusted by the force generating apparatus. A constant pressure for the penetration movement or the scanning movement can thus be maintained. In particular with a plurality of measurements, there can thus be continuity and an increased measurement security.

Preferably, the force generating apparatus has a pressure chamber having at least one first pressure surface which is operatively connected to the penetration body. Thus, with an increase in a pressure, a direct penetration movement of the penetration body can be controlled. Additionally, higher forces can thus be generated with an overall dimension size which is still sufficiently low.

The force generating apparatus having a pressure chamber preferably has an inlet opening and an outlet opening which are provided outside of or adjacent to the pressure surface in the pressure chamber. The pressure surface can thus be orientated exclusively in the direction of the penetration body and cooperate with this penetration body, such that the inlet and outlet opening are preferably arranged laterally to at least one first pressure surface and thus cannot directly influence the pressure surface.

The pressure generating apparatus preferably comprises at least one pump, through which the pressure medium is delivered to the pressure chamber. The pump can thus be controlled in a regulated manner, such that it determines the pressure in the pressure chamber directly.

Furthermore, an inlet control valve is preferably provided upstream of the inlet opening of the pressure chamber and an outlet valve is preferably provided downstream of the outlet opening of the pressure chamber. A pressure in the pressure chamber can thus be maintained and/or adjusted in a simple manner by such control valves.

A further preferred embodiment of the force generating apparatus provides a storage container between the pump and the inlet control valve or the inlet opening. Thus, for example, the pump can be formed to be relatively small, such that the control of the pressure chamber and the provision via the storage container by means of the pressure medium takes place as required. Additionally, pressure peaks generated by the pump can be reduced with a direct feed of the pressure medium from the pressure chamber.

The pressure chamber preferably has a second pressure surface which is opposite the first pressure surface. The pressure chamber can thus be formed in a simple form, for example as a pressurised can which has two opposite pressure surfaces, such that the pressure acting in the interior of the pressure chamber acts uniformly on both pressure surfaces.

Furthermore, the pressure chamber is preferably provided in a housing, on whose side wall or peripheral wall the inlet and outlet opening is arranged and which has a first pressure surface on a lower side. This represents a simple and cost-effective design of the measuring device, as well as a space-efficient integration of the pressure chamber in the measuring device.

Furthermore, a sensor is preferably assigned to the second pressure surface of the pressure chamber outside of the pressure chamber. A displacement of the second pressure surface can thus be detected by means of this sensor in order to detect the actual acting pressure force which is exerted on the penetration body due to the pressure prevailing in the pressure chamber.

Furthermore, the pressure chamber is preferably formed as a can which can be inserted into the housing. This has the advantage that calibrated pressurised cans can be integrated into a housing in a simple manner.

The first and second pressure surfaces are preferably formed as a pressure membrane, said pressure surfaces being orientated parallel to each other. Consequently, a fixed peripheral wall is provided therebetween, in which the inlet and outlet opening are arranged and preferably fastened to the peripheral wall of the housing. The pressure membrane can preferably be fastened to the peripheral wall by means of a fastening ring, whereby there can be a simple assembly of the pressure chamber.

Furthermore, the pressure chamber preferably has freedom of movement in only one degree of freedom. This one degree of freedom is preferably located in the longitudinal central axis of the housing, i.e. in a Z axis, which the infeed movement of the penetration body for penetrating the surface is also located.

Furthermore, the first measuring apparatus for measuring a travel path of the penetration body, in particular the depth of penetration of the penetration body or the scanning movement for identifying the surface roughness of the penetration body, is preferably provided between the first pressure surface, the pressure chamber and the penetration body. This in turn leads to a compact structure.

Furthermore, a further measuring apparatus for detecting a displacement of the penetration body along at least one axis is provided between the first pressure surface and the penetration body for a compact structure of the measuring device, said measuring apparatus corresponding to the travelling movement of the test body relative to the penetration body, in particular when a scratch resistance test is being carried out. Preferably, this further measuring apparatus is also positioned in the same Z axis as the first measuring device.

Furthermore, alternatively, the further measuring apparatus for detecting a displacement of the penetration body can be detected along the axis which corresponds to the travel path of the test body relative to the penetration body and also identified in an axis orientated at a right angle thereto. This further measuring apparatus can thus detect changes in the position of the penetration body during the penetration into the surface of the test body both in the X direction and in the Y direction—i.e. in the plane of the surface of the test body.

The measuring device for measuring the travelling movement of the penetration body along the Z axis, in particular the depth of penetration, and the at least one further measuring device for detecting at least one displacement of the penetration body along the travel path of the test body, are preferably provided in a housing portion of the housing, said housing portion adjoining the pressure chamber. These are preferably arranged in a row along a longitudinal axis of the housing, whereby the first and at least one further measuring apparatus can detect measuring signals directly during a penetration movement of the penetration body, said penetration movement being controlled by the pressure chamber.

A holding element is provided on a lower housing portion of the housing and at a distance from the first pressure surface of the pressure chamber, said holding element accommodating the penetration body. The penetration body is thus accommodated in a defined position relative to the housing. The holding element is preferably formed as a pressure membrane which has at least freedom of movement in one degree of freedom in the Z axis. A rotation or angular movement during the penetration of the penetration body into the surface of the test body is thus avoided.

Furthermore, the holding element is preferably formed to be soft or flexible in its extension plane at least in the direction of the displacement of the penetration body along the travelling movement of the test body and rigid in a direction perpendicular thereto. Further measuring signals can thus be detected during the introduction of a crack or scratch into the surface, in order to detect, for example, the homogeneity of the coating, inclusions or similar.

The holding element is preferably orientated parallel to the first and second pressure surface. Thus, all components involved in the travelling movement of the penetration body are oriented in a uniform manner. Furthermore, tilting of the penetration body relative to the force introduction via the pressure chamber can take place without loss by means of the holding element which is arranged at a distance from the first and second pressure surfaces.

The first and/or second pressure surface and/or the holding element are preferably made of copper beryllium. This material is especially suitable because it is virtually without hysteresis. A direct, loss-free control of the penetration body is thus possible.

Furthermore, a transmission pin is preferably provided between the first pressure surface and the penetration body. This is preferably formed to be pressure-resistant. A constructively simple and lightweight design can thus be created. Additionally, a direct connection between the penetration body and the first pressure surface can be produced.

Advantageously, the transmission pin is fixedly linked to both the pressure surface and the penetration body and forms a rigid connection. The actuating force generated by the pressure chamber can in turn be directly transformed into a penetration movement of the penetration body.

The at least one measuring device for measuring the travel path of the penetration body, in particular the penetration movement, and the at least one further measuring device each have at least two sensor elements which are moveable relative to one another, wherein each one of the sensor elements is arranged in a stationary manner on the housing and the at least one further sensor element is arranged on the transmission pin. Thus, during a penetration movement, a travel path is detected to the same extent both from the first and further measuring device, because these are arranged in a row.

Furthermore, the first measuring device preferably operates according to the eddy current method. Here, it involves proven measuring devices with no after-effects, which can also be provided with a compact design. For example, a ferrite plate or a ferrite ring can be fastened as a moveable sensor element on the transmission pin and a pot coil can be fastened on a housing as a second stationary sensor element, preferably releasably, in particular by a screw connection.

The at least one further measuring device for detecting the at least one displacement of the penetration body preferably comprises, for example, a ferrite ring or a ferrite ring as a moveable sensor element, said ferrite ring being arranged on the transmission pin, as well as at least one first coil which is assigned to the ferrite ring, such that the measuring device likewise operates according to the eddy current method. A displacement of the penetration body in the X direction can thus be detected. For example, the measuring device can have two coils which are arranged offset by 180° relative to each other in order to detect a displacement of the penetration body or the transmission pin along the travelling direction of the test body. Alternatively, two coils can also be assigned to a ferrite ring, which are offset by 90° relative to each other, such that, firstly, a displacement of the transmission pin along the travel path of the test body—i.e. in the X direction—and secondly, in the Y direction—can be detected.

Furthermore, a pressure stamp is preferably provided on the first and/or second pressure surface, which is provided for accommodation of a further element. Thus, for example, a sensor element or a component of a sensor element, such as, for example, a pressure sensor, can be arranged on the second pressure surface. Preferably, the transmission pin can be exchangeably fixed on the further stamp which is assigned to the first pressure surface.

A further advantageous embodiment of the measuring device provides that the penetration body is arranged exchangeably on the transmission pin. Thus, during repeated measurements, a simple exchange can take place. Alternatively, only the penetration tip can be formed exchangeably on the penetration body. This not only has the advantage that a fast exchange is enabled in the event of deterioration, but also that, depending on different surfaces to be tested, a corresponding penetration point can be selected and used. For example, the penetration point can be made of diamond, corundum, topaz or quartz.

Pressurised air is preferably provided as the pressure medium.

The object of the invention is further solved by a measuring arrangement for detecting measurement signals during a travelling movement, in particular of a depth of penetration or a scanning movement, of a penetration body into a surface or on a surface of a test body, in which a measurement table for accommodation of the test body is provided on a base body or a base plate, as well as a handling apparatus, in particular a tripod, which accommodates a measuring device which is transferred via the handling device into a position for placing a penetration body onto the test body, wherein the travelling movement for penetration of the penetration body into the surface of the test body or the travelling movement for scanning the surface of the penetration body is controlled and carried out by a measuring device according to one or more of the features described above of the embodiments.

Furthermore, the measuring arrangement preferably accommodates an optical detection apparatus adjacent to the measuring device, which optically detects and evaluates the penetration point, the surface roughness or, when the scratch-resistance test is being carried out, the scratch which has been introduced. Here, the measurement table is preferably transportable between the measuring device and the optical detection apparatus. Alternatively, the measuring device and the optical detection apparatus can be transportable to the measurement table.

Furthermore, a travelling movement of the measurement table, in particular an axis along a travelling direction in the plane of the surface of the test body, is preferably controlled by the controller. Thus, a surface contour or a roughness of the surface during placing of the penetration body onto the surface of the test body, which forms a start position, and a subsequent controlled travelling movement, can be detected by this controller. This can also be carried out for a pre-scan of a scratch-resistance identification. Likewise, a penetration movement of the penetration body can be controlled, starting from the start position, during the travelling movement of the measurement table towards the penetration body, in order to form a scratch. A post-scan for a scratch resistance test can also be controlled, starting from the start position.

A pump and preferably a storage container are provided for controlling the measuring device, said pump delivering the pressure medium to the measuring device with a delivery line, wherein this pump and preferably a storage holder are arranged separately from the mutual base body of the measuring device in order to avoid registering vibrations at least on the measurement table, in particular on the test body.

The object of the invention is furthermore solved by a method for detecting measurement signals during a penetration movement of a penetration body into a surface of a test body with a measuring device or during a scanning movement of a penetration body on a surface of a test body, in which the test body is positioned on a measurement table and the measuring device is placed on the test body, by a penetration movement of the penetration body being controlled with a force generating apparatus which is supplied by a test pressure of a gaseous pressure medium for the penetration movement of the penetration body into the test body or for a scanning movement on the test body. This enables a cost-effective design of the force generating apparatus. Additionally, an exact control of the penetration body can be achieved because the force generating apparatus comprises a low mass and thus there is no additional deterioration due to an slowia of high masses.

Preferably, the force generating apparatus is supplied with an initial pressure before the placement onto the surface of the test body, the measuring device is moved towards the test body and during placement of the penetration body of the measuring device the travelling movement of the measuring device is stopped, the force generating apparatus is subsequently supplied with a test pressure and a penetration movement of the penetration body in the surface of the test body is detected with a first measuring device. An exact detection of a hardness of a surface can thus be identified, because, firstly, the penetration movement and secondly, the force applied by the test pressure, can be evaluated in an exactly detected manner in order to identify the hardness of the surface of the test body. The initial pressure with which the force generating apparatus is supplied during the feed movement of the measuring device until the placement onto the test body, can, for example, be the ambient pressure. Alternatively, an overpressure can be introduced relative to the ambient pressure. Thus, defined states can be created relative to the force measurement apparatus.

Preferably, a pressure chamber is used as a force generating apparatus for carrying out the method, and a penetration movement of the penetration body into the surface of the test body is controlled with a first pressure surface of the pressure chamber. Here, a second pressure surface opposite the first pressure surface is moved relative to a sensor, wherein the force acting on the penetration body by means of the pressure chamber is detected by the sensor. The penetration movement generated by the pressure chamber is detected with respect to the depth of penetration by means of a first measuring device. The hardness of the surface of the test body can thus be determined, depending on the selected penetration body, from the force acting on the penetration body, said force being identified by means of the sensor, and the depth of penetration which is detected by the measuring apparatus. A pneumatic hardness measuring device can thus be created.

For identifying a scratch resistance of the surface of the test body, the measurement table is preferably transported in a direction perpendicular to the penetration movement of the penetration body during the penetration movement of the penetration body with the test body which is applied thereto, and a scratch is introduced into the surface of the test body. Measurement signals with respect to the depth of penetration are detected by a first measuring apparatus, depending on the time and the travelling path. Furthermore, a displacement of a penetration body against the travelling direction of the measurement table is detected by means of a second measuring apparatus. The scratch resistance of a surface of the test body can be determined from these detected signals.

Furthermore, a displacement orientated perpendicular to the travelling movement can preferably additionally be detected by a further measuring device during the introduction of a scratch into the surface of the test body. An evaluation with respect to the surface of the test body can thus additionally be created and, in particular, a statement on the homogeneity of the material can be achieved.

Furthermore, the measuring device is preferably placed on the surface before the introduction of a scratch into the test body, transported in a direction perpendicular to the placement direction of the test body and the surface is scanned. Signals are thus detected by the first measuring device and saved as a pre-scratching profile. The path of the surface of the test body can be determined by a so-called pre-scan, such that this further parameter can be taken into account during the subsequent determining of the scratch-resistance.

Furthermore, it is provided that a so-called post-scan is carried out for identifying the scratch resistance. For this purpose, preferably, the measuring device is placed onto the scratch after the introduction of the scratch into the test body, and the penetration body is transported with the measuring device in a direction perpendicular to the penetration movement of the test body, i.e. guided along in the scratch, and the detected measurement signals are stored.

A further preferred embodiment of the method provides that the test pressure is kept constant in the force generating apparatus during the scanning movement of the penetration body. The penetration body can thus be guided along the surface of the test body under constant conditions, wherein the pressure chamber is then effectively formed as a rigid actuating member, such that the travelling movement acting on the penetration body is transmitted directly along the longitudinal axis of the housing due to the surface roughness and can be detected by at least one sensor element. The test pressure can be the ambient pressure or an overpressure with which the pressure chamber is supplied.

Figure 3:
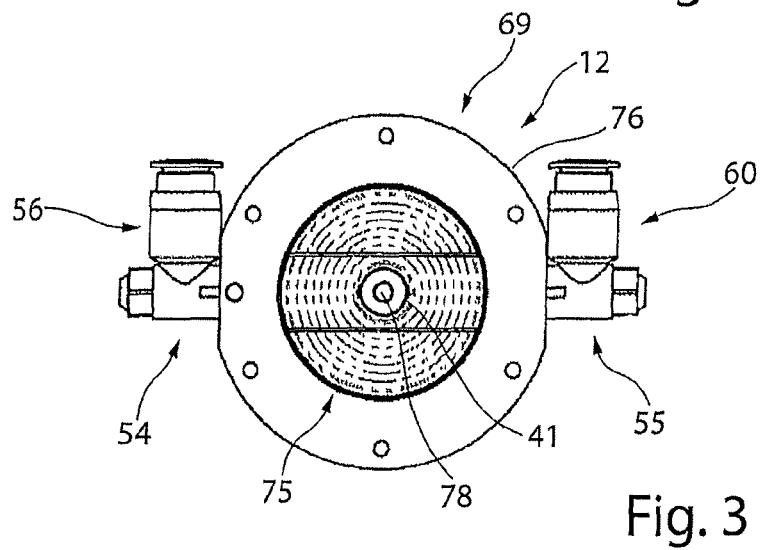
Figure 4:
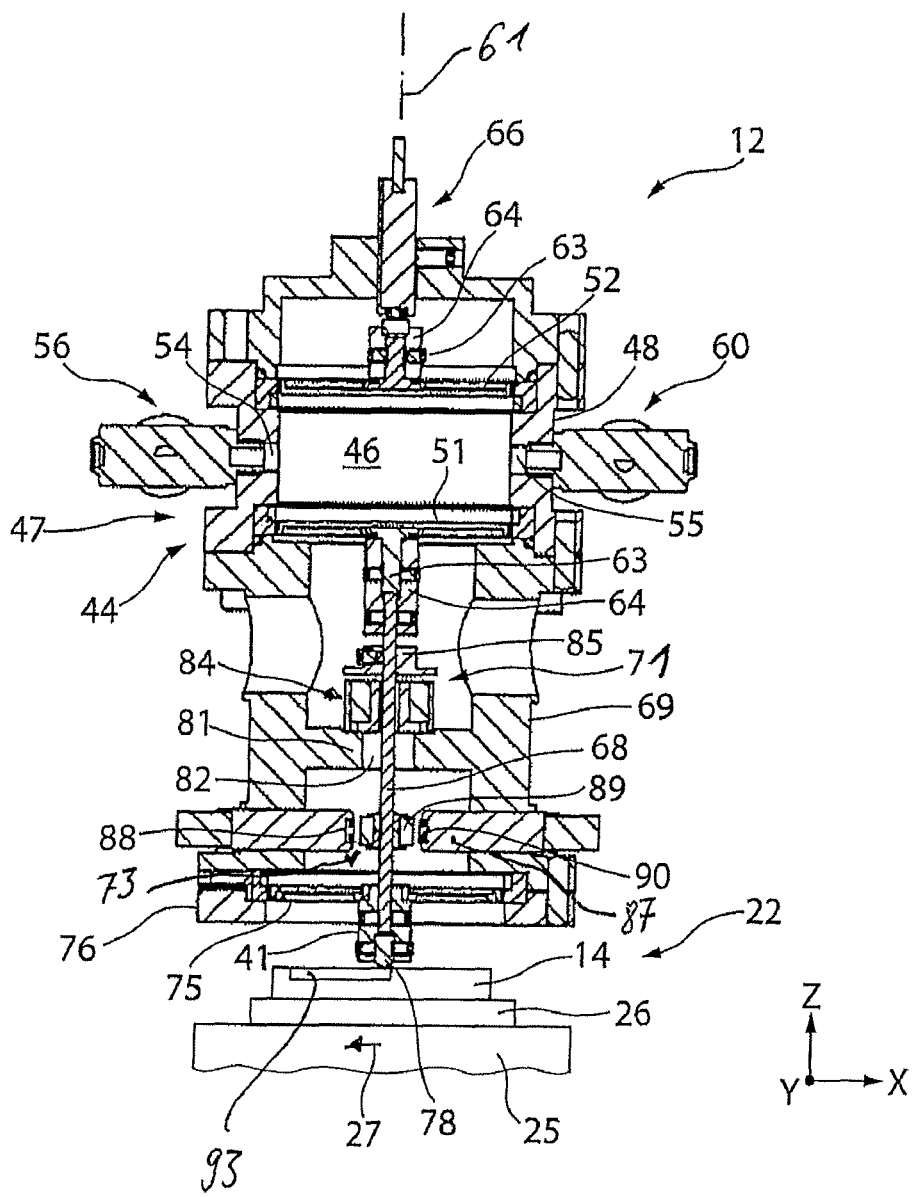

The invention as well as further advantageous embodiments and developments of the same are described and explained in more detail in the following using the examples depicted in the drawings. The features to be taken from the description and the drawings can be applied individually or in any combination according to the invention. Here are shown:

FIG. 1 a schematic view of a measuring arrangement according to the invention, FIG. 2 a schematically enlarged view of an inventive measuring device of the measuring arrangement according to FIG. 1, FIG. 3 a schematic view from below of the measuring device according to FIG. 2, FIG. 4 a schematic sectional view of the measuring device according to FIG. 2, and FIG. 5 a schematic view of the measuring device according to FIG. 2 and the components connected thereto where are controlled by a mutual controller.

A measuring arrangement 11 is schematically depicted in FIG. 1. Such a measuring arrangement 11 can be provided for testing mechanical and/or physical properties of surfaces on test bodies 14, such as, for example, films, layers, and/or coatings on objects. For example, the measuring arrangement 11 can be used as a hardness measuring apparatus in which a hardness measurement is carried out by penetration by means of a penetration body 41 of a measuring device 12. Furthermore, this measuring arrangement 11 can be provided with the measuring device 12 for identifying a scratch resistance of a film, a layer or coating on objects. Here, for example, CVD or PVD coatings can be checked with respect to their scratch resistance. Further micro-scratches can likewise be detected or other deformation information can be detected and analysed from the surface. This measuring arrangement 11 likewise also enables a roughness measurement of a surface of the test body 14, in particular with the measuring device 12, without accompanying damage to the surface of the test body 14. In this case, the penetration body 41 is placed on the surface of the test body 14 and transported along the surface for scanning the roughness of the surface of the test body 14.

The measuring device 11 comprises a mutual base body 16. This can preferably be formed from granite. A tripod 17 is provided on the base body 16, which accommodates the measuring device 12 on a boom 18. This tripod 12 comprises a drive motor 19, by means of which the measuring device 12 can be transported from an initial position 21 depicted in FIG. 1 into a test position 22, in which the penetration body 41 rests on a test body 14. For example, the drive motor 19 can drive the boom 18 for an up and down movement along a guide post 23 of the tripod 12.

A measurement table 25 is furthermore provided on the base body 16. This measurement table 25 has a measurement table receptacle 26 which can be moveably driven at least in the X direction according to arrow 27. The test body 14 is laid on the measuring table 26 and fastened thereto.

The measuring arrangement 11 can furthermore comprise an optical detection apparatus 29 which can likewise be arranged on the tripod 17 or, advantageously, separated therefrom on a further tripod 31. This optical detection apparatus 29 can be positioned adjacent to the measuring device 12. The measurement table 25 or the measuring table receptacle 26 is thus designed to be transportable in such a manner that the test body 14 is transportable relative to the optical detection apparatus 29 after the introduction of a penetration point or a scratch into the surface of the test body 14, so that the penetration point or the scratch which has been introduced can be optically detected in the surface of the test body 14. Alternatively, a travelling movement of the measuring device 12 and the optical detection device 29 can be provided relative to the measurement table 25.

Furthermore, the measurement arrangement 11 comprises a schematically depicted controller 33 which comprises a computing apparatus not depicted in more detail, a display device 35 and an input device 36. The controller 33 is connected to the tripod 17, the measuring device 12 and the measuring table 25 at least by signal lines. Preferably, the optical detection apparatus 29 and optionally the tripod 31 receiving the optical detection apparatus 29 is also attached thereto.

Furthermore, the measuring arrangement 11 has at least one pump 38 for controlling the measuring device 12, through which a pressure medium is delivered to the measuring device 12 in order to control a penetration movement of the penetration body 41 of the measuring device 12. This pump 38 is connected to the controller 33 with a signal line. Advantageously, the pump 33 can deliver the pressure medium to a storage container 39, from which the pressure medium is delivered to the measuring device 12 via a delivery line 40. Both the pump 38 and the storage container 39 are not arranged on the mutual base body 16.

Figure 2:
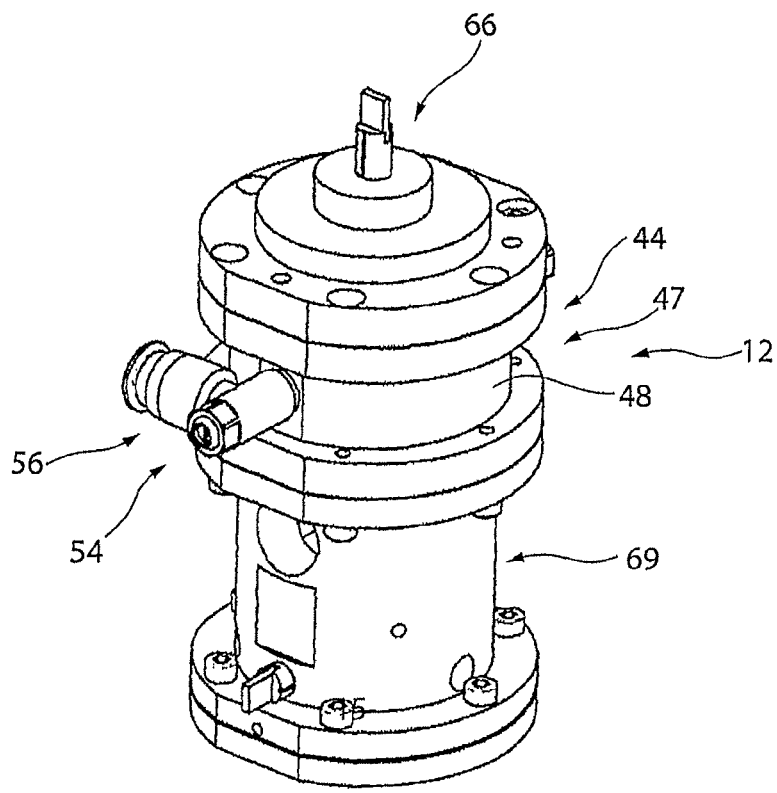

In FIG. 2, a perspective view of the measuring device 12 according to the invention is depicted. FIG. 3 shows a view from below. In FIG. 4, a schematic sectional view of the measuring device 12 according to FIG. 2 is depicted, to which more detailed reference is made, in particular, to the depiction of the structure.

This measuring device 12 has a force generating apparatus 44 by means of which a travelling movement, in particular penetration movement, of the penetration body 41 onto the surface of the test body 14 is controlled. This force generating apparatus 44 comprises a pressure chamber 46 which is integrated into a housing 47. This housing 47 has a cylindrical housing wall 48 to which a first pressure surface 51 and a second pressure surface 52 is assigned. These two pressure surface 51, 52 are advantageously fixed to the housing wall 48 by a releasable connection, in particular a clamp connection or screw connection. The pressure chamber 46 is formed by the housing wall 48 and the first and second pressure surfaces 51, 52. Alternatively, a closed pressure chamber with terminals arranged thereon can be used. An inlet opening 54 and an outlet opening 55 are provided on the housing wall 48, such that the pressure medium can be delivered and discharged.

An inlet control valve 56 is preferably provided in the delivery line 40 leading to the inlet opening 54. Alternatively, the inlet valve 56 is directly attached to the inlet opening. An outlet control valve 60 is arranged in a further delivery line 58 on the outlet side for outflow of the pressure medium from the pressure chamber 46. This can also be directly attached to the outlet opening 55.

The first and second pressure surfaces 51, 52 are preferably formed as a pressure membrane, in particular undulated pressure motors having preferably circular waves, which have one degree of freedom only in one direction, said degree of freedom being orientated in the Z direction and being on a longitudinal central axis 61 of the measuring device 12. A rotation of the pressure surfaces 51, 52 around the Z axis is prevented by the fixed clamping of the first and second pressure surfaces 51, 52 to the housing wall 48.

A pressure stamp 63 is fixedly arranged on each of the first and second pressure surfaces 51, 52. A sensor 66 assigned to the second pressure surface 52 can be fastened, for example, via a connection element 64. The sensor 66 is formed, in particular, as a pressure sensor which detects the pressure located in the pressure chamber 46 depending on the movement of the second pressure surface 52, and conveys it to the controller 33.

A transfer pin 68 is provided between the first pressure surface 51 and the penetration body 41, said transfer pin extending through a housing portion 69 which adjoins the housing wall 47. This housing portion 69 is formed to be cylindrical, such that a first measuring device 71 for detecting a travelling movement of the penetration body 41 is detected therein. Furthermore, a further measuring device 73 is preferably arranged in the housing portion 69, which detects at least one displacement of the penetration body 41 in the X direction during a penetration into the surface of the test body and preferably detects a simultaneous travelling movement of the test body 14 in the X direction. Furthermore, the at least one further measuring device 73 can also detect a displacement of the penetration body in the Y direction.

A holding element 57 is also provided on the lower housing portion 69, which receives the penetration body 41 and extends up to an outer edge region 76 on the housing portion 69. This holding element 75 can in turn be fastened to the housing portion 69 with a releasable connection. The holding element 75 is formed as a pressure membrane which has one degree of freedom in at least one movement direction. This at least one degree of freedom is in the Z axis or in the longitudinal central axis 61 of the measuring device 12. The holding element 47 is preferably provided with two longitudinal slots, as depicted in FIG. 3. The holding element 75 thus becomes soft in a direction parallel to the longitudinal slots, which correspond to the X axis, and rigid in a Y axis. Because the holding device 75 is formed as a pressure medium, this holding device has a very low flexibility and is preferably not formed to be pressure-resistant in the X and Y direction.

The penetration body 41 is fastened exchangeably on the lower end of the transmission pin 68. The penetration body 41 has a penetration tip 78 which can be releasably fastened on the penetration body 41.

The housing portion 69 has a shoulder 81 which forms a through bore 82 through which the transmission pin 68 extends. A first sensor element 84 of the first measuring device 71 is fixedly arranged on the shoulder 81 and a second sensor element 85 of the first measuring apparatus 71 is arranged adjacently thereto on the transmission pin 68. For example, the first and second sensor element 84, 85 are formed as a distance sensor, wherein the first sensor element 84 comprises a pot magnet having a coil and the second sensor element 85 is a disc made of a ferritic material which is fastened to the transmission pin 68. This second sensor element 85 is preferably releasable on the transmission pin 68 and adjustable in its distance from the first sensor element 84, such that an alignment of the penetration body 41 in an initial position is possible. The measuring device 71 operates according to the eddy current principle.

The further measuring device 73 comprises a first sensor element 88 arranged on a holder 87, which is provided to be fixed in place or housing-fixed, as well as a second sensor element 89 which in turn engages the transmission pin 68. According to a first embodiment, this second sensor element 89 can be formed as a ferrite ring, opposite to which is a coil that forms the first sensor element 88. A deflection of the penetration body 41 in the X direction can thus be detected, which is generated during the introduction of the penetration point or the scratch through the surface onto the penetration body 41 and transmitted to the transmission pin 68. In addition, a third sensor element 90 can also be provided in order to detect a deflection in the X direction, such that an improved statement on the deviation in the X direction can be identified by a comparison of the detected values to the first and third sensor element 88, 90. Alternatively, the third sensor element can also be arranged offset by 90°, such that the first sensor element 88 detects a deflection in the X direction and the third sensor element 90 detects a deflection in the Y direction.

Figure 5:
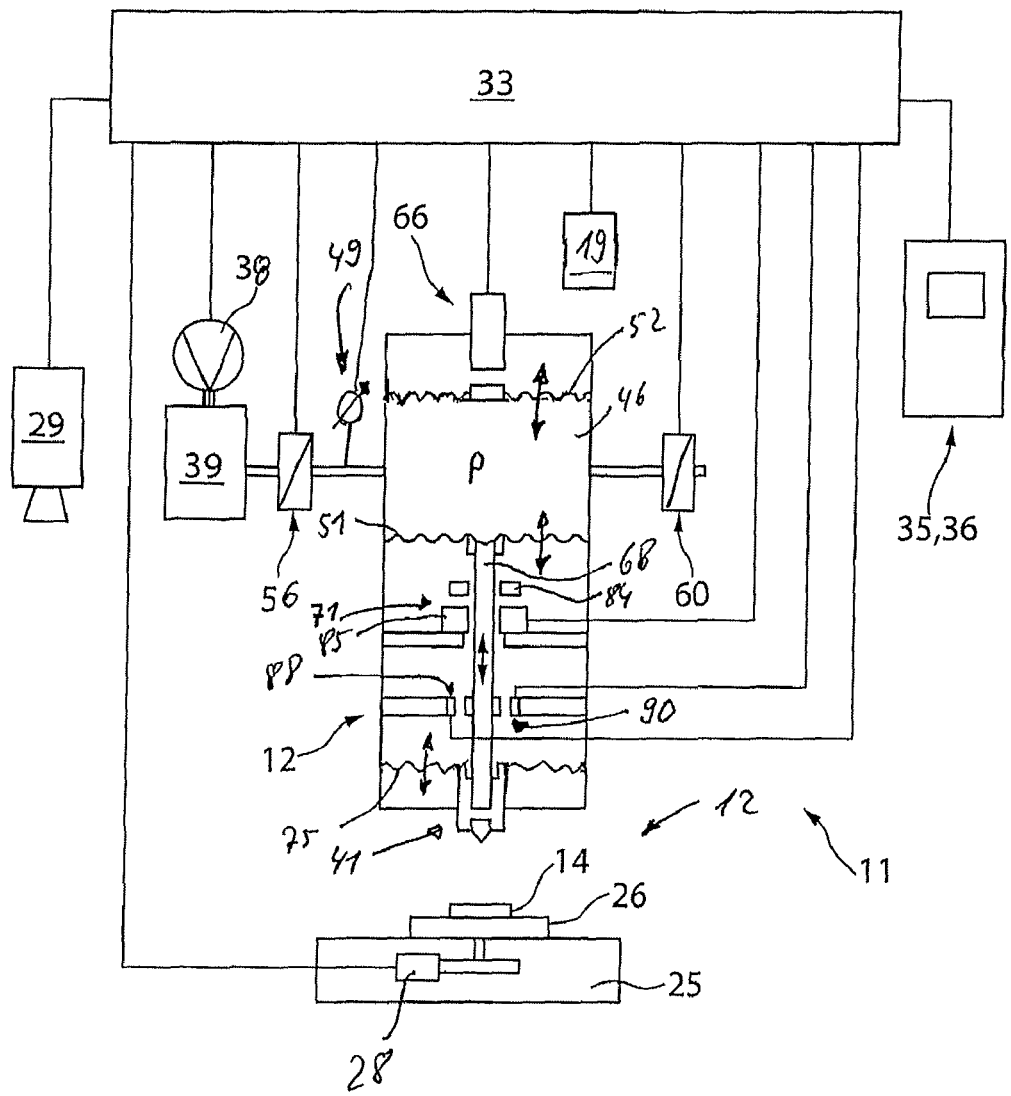

FIG. 5 shows a schematic arrangement of the individual components of the measuring arrangement 11, which are connected to the controller 33 via control lines. Using this schematic depiction, a method for carrying out a hardness measurement and a method for determining the scratch resistance of the surface of a test body 14 is discussed in the following.

For the hardness measurement of a surface of the test body 14, the test body 14 according to FIG. 5 is positioned and fixed on a measurement table receptacle 26 of the measurement table 25. The force generating apparatus 44 is supplied with an initial pressure. For example, the pressure chamber 46 can be provided with an ambient pressure. This is achieved by the control valve 60 being opened and the control valve 56 being closed. Subsequently, the measuring device 12 is moved towards the surface of the test body 14 along the Z axis, for example by means of the motor 19 of the tripod 17. As soon as the penetration body 41 is seated on the surface of the test body 14, a signal is detected by the first measuring device 71, due to a merely slight longitudinal movement or plunging movement of the penetration body 41 relative to the housing 47 of the measuring device 12 along the Z axis, and the lowering movement of the measuring device 12 along the Z axis is stopped. Here, the plunging movement of the penetration body 41 can be transmitted to the transmission pin 68, whereby the first sensor element 84 opposite the second sensor element 85 is removed from the first measuring apparatus and thus emits a measuring signal.

Starting from this start position for the hardness measurement, in which the penetration body 41 rests on the surface of the test body, the outlet control valve 60 is closed and the inlet control valve 56 is opened, such that the pressure chamber 46 is supplied with a test pressure. This pressure of the in-flowing pressure medium, said pressure being present in the inlet opening 54, is detected with a pressure sensor 49 and is conveyed to the controller 33. The build-up of the pressure in the pressure chamber can take place directly by means of the pump 38 or be provided by the pump 38 or by the container receptacle 39 and regulated by the inlet control valve 56.

During the build-up of the test pressure in the pressure chamber 46, the first and second pressure surfaces 51, 52 are displaced. The first pressure surface 51 causes a penetration movement of the penetration body 51 into the test body 14. The second pressure surface 52 is moved in the direction of the sensor 66 by means of the test pressure. The displacement of the second pressure surface 52 is determined, firstly, by the test pressure, wherein a spring constant of the material of the second pressure surface 52 proportionally counteracts this pressure. The sensor 66 detects a change in distance from the second pressure surface 52, from which the test pressure acting on the penetration body 41 is determined, due to the detected test pressure of the spring constant of the second pressure surface 52 and the distance from the second pressure surface 52, said distance being detected by the pressure sensor 66.

Due to the detected measuring signals of the first measuring device 71 with respect to the penetration movement and the actual identified test force, the hardness of the surface of the test body 14 can be determined. The shape or geometry of the penetration body 41 is also included in determining the hardness of the surface. For example, the penetration body 41 can be pyramid-shaped. This penetration body can consist, in particular, of diamond, corundum, topaz or quartz.

After the penetration movement of the penetration body 41 is ended, for example, the measuring device 12 can be raised from the test body 14 and the outlet control valve 60 can subsequently be opened. The outlet control valve 60 can likewise be opened firstly and then the measuring device 12 raised, or both can take place simultaneously.

On the transmission pin 68 and assigned thereto on a housing portion, the measuring device 12 has a second or further measuring device 73. During the penetration movement of the penetration body 41 into the test body 14, displacement movements which are taking place in the plane of the surface of the test body 14—i.e. in the XY direction—can thus likewise be detected and taken into account as further assessment parameters.

Subsequently, after the introduction of a penetration point in the test body 14, an illustration of the penetration point can be identified with the optical detection apparatus 29 and an optical evaluation can also be carried out.

The test body 14 is positioned on a measurement table 25 or on a measurement table receptacle 26 of the measurement table 25 for identifying the scratch-resistance of a surface of a test body 14. The measuring device 12 is positioned above the test body 14, such that a penetration body 41 can be moved towards this test body by means of a feed movement perpendicular to the surface of the test body 14. The pressure chamber 46 of the measuring device 12 is supplied with an initial pressure. This initial pressure can be an ambient pressure which is adjusted, for example, by the inlet control valve 56 being closed and the outlet control valve 60 being open. The penetration body 51 is located in a rest position or off position in which it is positioned by the first pressure surface 51 of the pressure chamber 46 and by the holding element 75. The initial position of the measuring device 12 relative to the test body 14 is depicted in FIG. 5.

The measuring device 12 is subsequently moved towards the test body 14. This takes place, for example, by means of the motor 19. As soon as the placement of the penetration body 41 on the surface of the test body 14 has been detected by the first measuring device 71, the motor 19 is stopped. The measuring device 12 is arranged in a start position relative to the test body 14. This start position can be provided for a so-called pre-scan for identifying the scratch-resistance. This start position can also be provided for a measurement of the surface roughness of the surface of the test body.

Starting from this start position, a so-called pre-scan can firstly be carried out, i.e., the surface of the test body 14 is scanned along a pre-determined travelling route of the penetration body 41. This travelling route is orientated tangential or perpendicular to the test body 14 and, for example, along the X axis. The measuring device 12 preferably stops, and the measurement table 25 is transported by a motor 28 in the arrow direction 27 according to FIG. 4, whereby the position of the surface and the contour of the surface are scanned and the measured signals are saved as pre-scratch profile data, also known as pre-scan. Subsequently, the measuring device 12 is raised from the test body 14. The measuring device 12 and the measuring table 25 are positioned in the start position again. Subsequently, the same travelling movement as in the pre-scan according to arrow 27 is in turn driven by the controller 33 by means of the motor 28. At the same time as this travelling movement, the pressure chamber 46 is supplied with a test pressure, whereby the penetration body 41 penetrates increasingly into the surface of the test body 14 during the travelling movement of the measurement table 25. This penetration movement is detected by the first measuring device 71. Simultaneously, the actual pressure prevailing during the travelling movement is detected via the sensor 66. Additionally, a displacement of the penetration body 44 in the direction of arrow 27—i.e. in the travel direction—is detected by means of the further measuring device 73, in particular the by first and second sensor element 88, 89, via the controller 33. At the end of the pre-determined travelling movement, after application of the pre-determined test force, the measuring device 14 is in turn raised from the test body 12. The measuring signals detected during the introduction of the scratch 93 (FIG. 4) are stored and evaluated by the controller 33 in order to determine the scratch-resistance.

The measuring device 12 and the measurement table 25 can be returned to the start position again after the introduction of the scratch 93 into the test body 14. A post-scan can take place subsequently. The penetration body 41 is positioned in the scratch 93. In turn, a travelling movement of the measuring table 25 according to arrow 27 takes place, whereby the penetration body 41 is guided along the scratch 93. The measuring signals are detected again by the first measuring device 71 and the further measuring device 73 and/or the sensor 66 during the travelling movement of the penetration body 41 into the scratch 93.

Additionally, a displacement of the penetration body 41 in the Y direction can be detected during the pre-scan, the introduction of the scratch 93 and/or the post-scan by means of a third sensor 90 of the further measuring apparatus 73. Alternatively, this third sensor element 90 can also detect a deflection in the X direction in addition to the first sensor element 88.

The optical detection apparatus 29 can detect the scratch and additionally enable an optical evaluation after the introduction of the scratch 93 and/or after the post-scan.

Starting from the above-mentioned start position in which the penetration body 41 is placed on the surface of the test body 14, the measurement of the surface roughness can be carried out. The penetration body 41 is moved along a pre-determined travelling route on the surface of the test body 14. This travelling route is orientated tangentially or perpendicular to the test body 14 and, for example, along the X axis. The measuring device 12 can thus stop, and the measurement table 25 is —as depicted in FIG. 4—transported by a motor 28 in the arrow direction 27. Alternatively, the measurement table 25 can also stop and the measuring device 12 can be transported. A relative movement of measurement table 25 and measuring device 12 is likewise possible. The travelling movement of the penetration body 41 along the longitudinal axis of the housing 47 or the Z axis, said travelling movement being generated by the roughness of the test body 14, is transmitted by the transmission pin 48 and the pressure chamber 46, whereby a path change between the second pressure surface 52 and the sensor 66 is detected and evaluated by means of the controller 33. After the scanning of a pre-determined travelling route along the surface of the test body 14, the measuring device 12 is raised again by the test body 14.

The invention claimed is:

1. A measuring device for detecting measurement signals during a penetration movement of a penetration body into a surface of a test body for identifying the scratch resistance of the surface of the test body or during a scanning movement of the penetration body on the surface of the test body for identifying the surface roughness, having a housing which has a force generator, which is operatively connected to a penetration body for generating a travelling movement of the penetration body along a longitudinal axis of the housing and a controls a penetration movement of the penetration body into a surface to be tested of the test body or positions the penetration body on the surface of the test body for scanning and to at least one first measuring device for measuring the depth of penetration into the surface of the test body or a travelling movement of the penetration body along the longitudinal axis of the housing during a scanning movement on the surface of the test body, wherein the force generator is controlled by a gaseous pressure medium for the penetration movement of the penetration body, wherein the force generator has a pressure chamber having at least one first pressure surface, said force generator being operatively connected to the penetration body, wherein the pressure chamber has a second pressure surface which is opposite the first pressure surface, wherein the first and second pressure surfaces have freedom of movement in only one degree of freedom, wherein the at least one first measuring device for measuring the travelling movement of the penetration body is provided between the first pressure surface and the penetration body, and at least one further measuring device is provided between the first pressure surface and the penetration body for detecting at least one displacement of the penetration body along the axis of the travelling movement of the test body relative to the penetration body, wherein the at least one first measuring device and the at least one further measuring device are provided in a housing portion of the housing, said housing portion adjoining the pressure chamber, and wherein a holding element which accommodates the penetration body is provided on a lower peripheral region of the housing portion of the housing and at a distance from the first pressure surface.

2. The measuring device according to claim 1, wherein the pressure chamber has an inlet opening and an outlet opening which are provided outside of or adjacent to the first pressure surface in the pressure chamber.

3. The measuring device according to claim 2, wherein a sensor is outside of the pressure chamber.

4. The measuring device according to claim 1, wherein the force generator has at least one pump which delivers the pressure medium to the pressure chamber.

5. The measuring device according to claim 1, wherein an inlet control valve is provided upstream of the inlet opening of the pressure chamber and an outlet control valve is provided downstream of the outlet opening of the pressure chamber.

6. The measuring device according to claim 1, wherein the pressure chamber is provided in a housing, which is formed by a side wall or peripheral wall of the housing, on which the inlet opening and the outlet opening are provided and which accommodates the first pressure surface on the lower side and the second pressure surface on the upper side.

7. The measuring device according to claim 1, wherein a sensor for detecting a displacement movement of the second pressure surface, is assigned to the second pressure surface.

8. The measuring device according to claim 1, wherein the pressure chamber is formed as a pressurised can which is insertable into the housing.

9. The measuring device according to claim 1, wherein the first and second pressure surfaces are formed as a pressure membrane, which are orientated parallel to each other and are fastened on the peripheral wall of the housing.

10. The measuring device according to claim 1, wherein the holding element is formed as a pressure membrane and has freedom of movement in the degree of freedom of the first and second pressure surface.

11. The measuring device according claim 10, wherein the first and/or second pressure surface and/or the holding element consist of copper-beryllium.

12. The measuring device according to claim 1, wherein the at least one first measuring device and the at least one further measuring device each consist of at least two sensor elements which are moveable relative to one another, and in each of the at least one first measuring device and the at least one further measuring device least one of the sensor elements is arranged fixedly on the housing and the at least one other of the sensor elements is arranged on a transmission pin.

13. The measuring device according to claim 12, wherein the at least one first measuring device operates according to the eddy current principle and wherein the at least one further measuring device operates according to the eddy current principle.

14. The measuring device according to claim 1, wherein a pressure stamp is provided on the first and/or second pressure surface to which further components can be fastened by means of a connection element.

15. The measuring device according to claim 1, wherein the pressure medium is pressurised air.

16. A measuring arrangement for detecting a depth of penetration in a surface of a test body, in particular for detecting the scratch resistance of a surface of a test body, or for detecting a surface roughness of a surface of a test body,
having a measuring table for accommodating the test body,
having a handling apparatus for transferring a measuring device from an initial position into a measuring position,
having a base body on which at least the measuring table and the handling apparatus are provided,
having a controller for controlling and carrying out a measurement with the measuring device on the test body, which controls a placement of a penetration body of the measuring device on the test body with the handling device, wherein the penetration movement of the penetration body into the surface of the test body or the scanning movement of the penetration body on the surface of the test body with the measuring device is provided according to claim 1.

17. The measuring arrangement according to claim 16, wherein an optical detection apparatus is arranged adjacently to the measuring device on the base body, wherein the measuring table is transportable between the measuring device and the optical detection apparatus or the measuring device and the optical detection apparatus are transportable relative to the measuring table and wherein a travelling movement of the measuring table along an axis in the plane of the surface of the test body, is controlled by the controller.

18. The measuring arrangement according to claim 16, wherein at least one pump is provided which delivers the pressure medium to the measuring device with a delivery line.

19. A method for detecting measurement signals during a penetration movement of a penetration body into a surface of a test body of the measuring device according to claim 1, or during a scanning movement of a penetration body on a surface of a test body, in which the test body is positioned on a measuring table and the measuring device is placed on the test body in a start position, wherein the penetration movement or the scanning movement of the penetration body is controlled with a force generator which is supplied with a test pressure of a gaseous pressure medium for the penetration movement of the penetration body into the test body or which is supplied with a test pressure for the scanning movement on the test body.

20. The method according to claim 19, wherein the force generator is supplied with an initial pressure before the penetration of the penetration body onto the surface of the test body, the measuring device is moved towards the test body, the travelling movement of the measuring device is stopped during placement of the penetration body onto the test body, the force generator is supplied with a test pressure and a penetration movement of the penetration body into the surface of the test body is detected with a first measuring device.

21. The method according to claim 19, wherein a pressure chamber is used as the force generator and a penetration movement of the penetration body is controlled with a first pressure surface and, opposite, a second pressure surface is moved relative to a sensor, the force acting on the penetration body is detected by the sensor and the depth of penetration of the penetration body into the test body is detected by the first measuring device and the hardness of the surface of the test body is determined from the detected penetration force by the sensor and the detected depth of penetration depth by the first measuring device depending on the geometry of the penetration body.

22. The method according to claim 19, wherein during the penetration movement of the penetration body in the test body, the measuring table is transported in a direction perpendicular to the penetration movement of the penetration body and a scratch is introduced into the surface of the test body and the measuring signals of the first measuring device for the depth of penetration and the measuring signals of a further measuring device assigned to the penetration body detect and evaluate a displacement of the penetration body along the travelling direction of the test body as well as the measuring signals of the sensors.

23. The method according to claim 22, wherein during a penetration movement of the penetration body into the test body and a travelling movement of the measuring table for forming a scratch, a travelling movement of the penetration body at a right angle to the travelling movement of the test body is detected with a third sensor element of a further measuring device.

24. The method according to claim 22, wherein before the introduction of the scratch into the test body, the measuring device is placed on the surface of the test body and transported in a direction perpendicular to the placing movement of the test body and the measuring signals detected by the first measuring device are detected and saved as pre-scratching profile data.

25. The method according to claim 22, wherein after the introduction of the scratch into the test body, the measuring device is placed in the scratch and the penetration body is transported with the measuring device in a direction perpendicular to the placing movement of the test body and the signals detected by the measuring device along the travelling movement of the penetration body in the scratch are detected and saved as post-scratching profile data.

26. The method according to claim 19, wherein the test pressure in the force generator is kept constant during the scanning movement of the penetration body.

* * * * *